(12) United States Patent
Bonta

(10) Patent No.: US 6,895,246 B2
(45) Date of Patent: May 17, 2005

(54) METHOD AND APPARATUS FOR OPTIMAL SYSTEM CONTROL PARAMETER ASSIGNMENTS BASED ON MOBILE LOCATION

(75) Inventor: Jeffrey D. Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 874 days.

(21) Appl. No.: 09/736,799

(22) Filed: Dec. 14, 2000

(65) Prior Publication Data

US 2002/0077103 A1 Jun. 20, 2002

(51) Int. Cl.$^7$ ................................................. H04Q 7/20
(52) U.S. Cl. ...................................... 455/442; 370/331
(58) Field of Search ................................ 455/436–442; 370/331, 332, 333, 334

(56) References Cited

U.S. PATENT DOCUMENTS

| | | |
|---|---|---|
| 5,235,633 A | 8/1993 | Dennison et al. |
| 5,640,676 A | 6/1997 | Garncarz et al. |
| 5,946,621 A * | 8/1999 | Chheda et al. ............... 455/440 |
| 6,351,642 B1 * | 2/2002 | Corbett et al. .............. 455/442 |
| 6,535,738 B1 * | 3/2003 | Bomar et al. ................ 455/436 |

* cited by examiner

Primary Examiner—Nick Corsaro

(57) ABSTRACT

A method of assigning an optimal system control parameter in a wireless communication system (10) having one or more transceivers (11a)–(11g) includes applying a reference frame (14) having a plurality of regions (16)–(20) to the coverage area of the communication system (10). The reference frame (14) is independent of the locations of the one or more transceivers (11a)–(11g) and each of the plurality of regions (16)–(20) corresponds to a location estimate. A code is assigned to each of the plurality of regions (16)–(20), the code corresponding to a system control parameter optimized for that region. A mobile station (12) is assigned the code corresponding to where the mobile station (12) is located.

23 Claims, 3 Drawing Sheets

METHOD AND APPARATUS FOR OPTIMAL SYSTEM CONTROL PARAMETER ASSIGNMENTS BASED ON MOBILE LOCATION

TECHNICAL FIELD

The present invention relates generally to cellular communication systems, and more specifically to a method and apparatus for assigning a system control parameter to a mobile station.

BACKGROUND OF THE ART

In all cellular systems, a mobile station needs to constantly receive neighbor list assignments for handoffs between one base station and another base station as the mobile station moves out of the range of one cell and into the range of a new cell. However, there is an amount of uncertainty as to which cell the mobile station will move into and thus which base station will best be able to serve the mobile station. Neighbor lists help in the handoff by providing the mobile station with candidate cells. That is, those cells that could become the serving cell for the mobile station.

Today's neighbor lists are determined based on a variety of inputs ranging from path-loss predictions to field measurements, and may also include intuition on the part of the systems or field engineer. From these inputs, a list of possible neighbors of any given cell is selected and saved for any mobile that is served by that cell.

However, many of the current cellular systems have shortcomings in generating and assigning an appropriate neighbor list to the mobile station. Consequently, the mobile station may not receive the most optimal neighbor list and hence the correct neighbor does not become a handover candidate at the appropriate time. This can result in poor signal quality if the mobile station is connected to the wrong base station due to the inaccuracies in the neighbor list. These problems can also cause too many dropped calls to occur.

Moreover, in most cases the neighbor list selection tends to include all possible situations that any given mobile unit may experience which makes the neighbor list assignments large. This is especially true with respect to dense call systems or cell sectorization where a cell is divided into six sectors with each sector having multiple sectors of multiple cells as its neighbors.

A further problem that is encountered is when the neighbor list is based on the serving cell(s) of the mobile station's current call connection (i.e. a cell-centric assignment), and thus the list contains neighbors that have little relevance to the current location of the mobile. Another issue is that the time needed to scan the neighbors is detrimentally slow relative to a rapidly changing signal because the neighbor lists are often too large. Lastly, there is a limit on the number of neighbors a mobile can be told to scan and when the limit is reached, potentially desirable neighbors do not get scanned. In effect, the neighbor list is artificially truncated.

FIG. 1 helps to illustrate some of the above-stated problems. A mobile served by cell I may need to hand over to one set of neighbors as it moves through region A, such as cells II and III. The mobile station may need to hand over to a second set of neighbors as it moves through region B such as cells V and VI, and it may need to hand over to yet a third set of neighbors as it moves through region C such as cells VI and VII. Accounting for all of these possibilities creates a sizable neighbor list, and one that is less than optimal from the perspective of the time needed to scan all of them. Many of these neighbors do not need to be scanned. In fact, scanning them can lead to measurement falsing on reused frequencies or pilot offsets. Furthermore, a cell-centric method of generating a neighbor list would include cells II–VII, but if the mobile station is in region C, cells II–V have little relevance to the location of the mobile station.

Furthermore, if there was an obstacle 13 such as vehicular traffic, seasonal vegetation, construction, etc. between the mobile in region C and base station 11f, the inclusion of and possible connection to cell VI would not be the optimal choice. A better choice would be cell VII. However, the current cell-centric assignments of neighbor lists would include cell VI. If cell VI were to become the serving cell, the call would be dropped due to the interfering obstacle even though the mobile could be going through cell VI.

Given that there is a limit to the number of neighbors that a mobile station can measure, if a desirable neighbor is not on the list the call can have poor reception or the call could even be dropped. Even if the call is not dropped, the mere size of the list requires the mobile to scan all of the neighbors in that list. As a result, updates to the list are quite slow due to the time it takes to go through the list, and what was initially a good cell candidate has now become a poor cell candidate. However, the mobile still considers it to be a good cell candidate because it has not been able to re-scan that cell. A connection to the cell based upon the initial scan thus results in poor signal quality or even a dropped call. With the increasing pressure to minimize call drops in cellular systems and to improve drop call performance, it is critical that mobile stations operate with the optimal control parameters to avoid dropping calls.

Methods are known to hand over on the basis of a location estimate, while other methods that are known just explain how to locate a mobile station. The problem is that current location technologies do not practically provide absolute location. Consequently, a handover on the basis of a location estimate tends to be closer to a "blind" handover to a neighbor that may not be optimal due to the location inaccuracy as well as a varying radio environment. There are also many methods that are known to find the optimal neighbor list, but they all tie the neighbor list to a specific cell (i.e. they are cell-centric). This results in the problems stated above. Moreover, the above-stated problems extend beyond neighbor lists to other system control parameters that are associated with the serving cell, such as power control, handover thresholds and handover timers.

Thus there is a need for a method and apparatus for generating and assigning an optimal neighbor list or other system control parameters based on the actual location of the mobile station as opposed to a cell-centric system.

DESCRIPTION OF THE PREFERRED EMBODIMENTS

Figure 1:
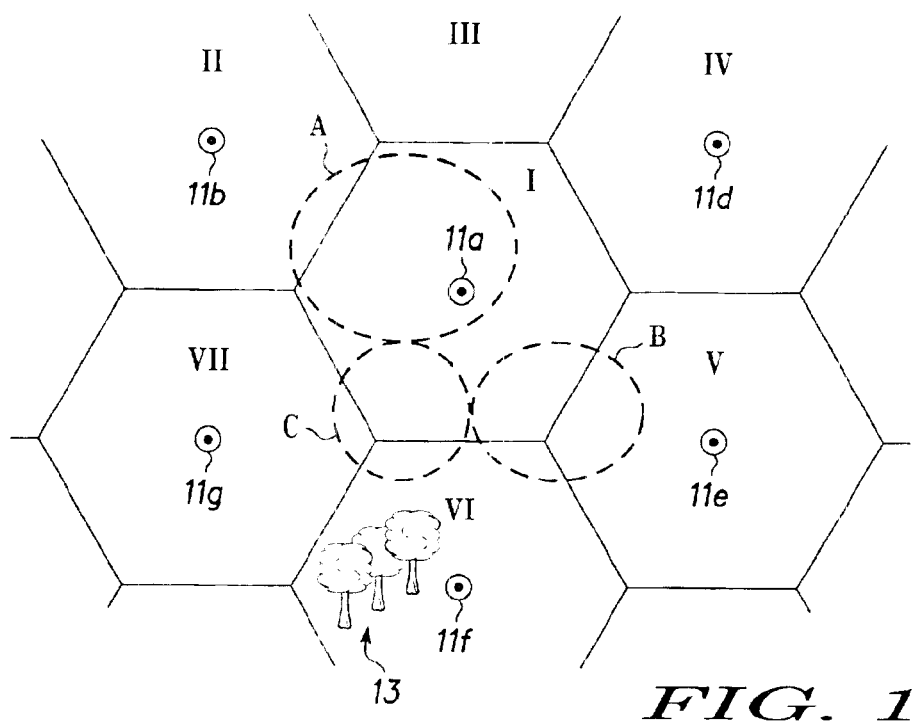
FIG. 1 is an illustrative example of the problems associated with the prior art.

The invention is directed to a method of assigning an optimal system control parameter to a mobile station in a cellular communications system. In accordance with one aspect of the present invention, the method includes applying a reference frame, such as a grid, to the coverage area of the communications system, independently of the transceivers. Each region defined by the reference frame is assigned a code corresponding to a system control parameter. This system control parameter may be a neighbor list of handoff candidates, a handover timer, a handover threshold, or a power control threshold. When a mobile station is located as being within one of the regions defined by the reference frame, the mobile station is provided with the system control parameters optimized for that region.

In accordance with another aspect of the present invention, a method of assigning an optimum system control parameter to a mobile station is provided. The coverage area of the communications system is divided into defined geographic regions irrespective of the locations of the transceivers. A code corresponding to a system control parameter is assigned to each of the regions. The mobile is located as being within a first region and is provided with the code and system control parameter assigned to the first region.

In accordance with still another aspect of the present invention, a communications system having several base stations and a number of geographic regions positioned irrespective of the base stations is provided. A system control parameter is assigned to each of the geographic regions. The communications system further includes means for determining the geographic region in which a mobile station is located and means for assigning the mobile station the system control parameter for that geographic region.

In accordance with yet another aspect of the present invention, a mobile station is provided. The mobile station includes means for being located within a region corresponding to a location estimate and means for receiving a code corresponding to a system control parameter optimized for that region.

In accordance with a further aspect of the present invention, a method for providing neighbor lists optimized for a mobile station's location is provided. The method includes assigning a first code to a first region, the first code corresponding to a neighbor list optimized for the first region. The method further includes assigning a second code to a second region, the second code corresponding to a neighbor list optimized for the second region. The first and second codes are compared, with the corresponding neighbor lists being merged if the two codes are different. The merged list is then provided to the mobile station located in the first region.

In accordance with a still further aspect of the present invention, a method of building and optimizing system control parameters is provided. The method identifies a first set assigned to a first receiving location as being unique or equivalent as compared to a second set assigned to a section receiving location. A signal within an add-threshold level is received in the first receiving location and added to the first set. The updated first set is compared to the second set and a code to be associated with the first receiving location is determined based upon the comparison.

In accordance with yet still another aspect of the present invention, a computer program is provided. The computer program has a first routine that applies a reference frame to the coverage area of a communications system, the reference frame comprising a number of regions corresponding to location estimates. A second routine assigns each one of the regions a system control parameter code and a third routine provides a mobile station with the code.

Figure 2:
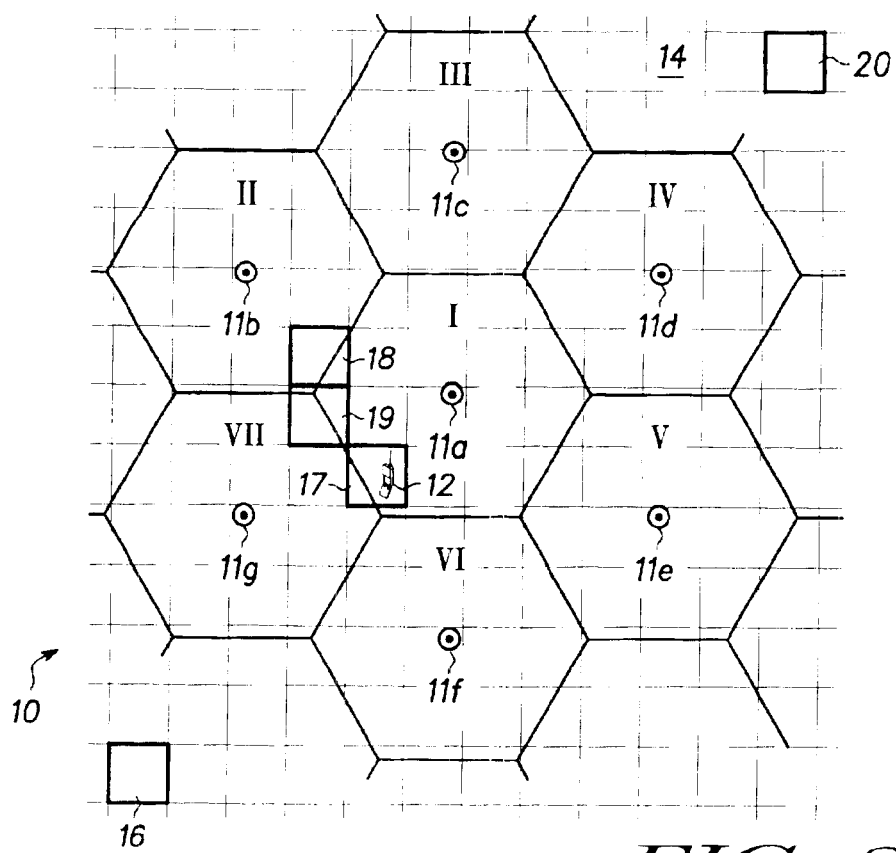
FIG. 2 is a conceptual diagram of the present invention according to a preferred embodiment.

Referring now to FIG. 2, a system for assigning an optimal system control parameter is shown according to a preferred embodiment of the present invention. The cellular system 10 includes base stations 11a–11g and corresponding cells I–VII defining the coverage area of the system 10. Unlike traditional methods of neighbor list assignments which are based on preassigned neighbor cells associated with the serving cell or cells in the current call connection, the present invention provides for dynamic neighbor list assignment based on where the mobile unit 12 is currently located. This technique allows only the neighbor cells that are in the proximity of the mobile 12 to be included in the neighbor list. In other words, the neighbor list is determined by a location-centric method as opposed to a cell-centric method.

The present invention is enabled by various location techniques such as the current Global Positioning System (GPS) assisted location approach being evaluated for Emergency 911. However, other location techniques could also be used such as RF signature patterns, center-of-mass calculations, etc. as are well known in the art. Furthermore, the present invention can be applied to any signaling system, though for the preferred embodiment an IS-95 Code Division Multiple Access (CDMA) system is contemplated.

As the mobile unit 12 moves through the coverage area of system 10, the GPS assisted location approach (not shown) performs periodic location estimates of the mobile unit 12. The coverage area of the system 10 is assigned a reference frame such as a grid 14 where each grid element accounts for the variance in the estimate made by the GPS assisted location approach. Grid elements 16–20 are identified to collectively represent each of the grid elements forming grid 14, and specific reference is made to individual grid elements 16–20 as necessary in the following discussion. The reference frame 14 and grid elements 16–20 are applied independent of the locations of transceivers 11a–11g. Each grid element 16–20 is assigned a code wherein each code corresponds to a unique neighbor list. The neighbor list is defined as a group of cells that are deemed neighbors for that particular location or grid element, which is independent of the location of the current serving cell. For example, if the mobile 12 is located in grid element 17 within cell I the neighbors for that grid element would likely include cells VI and VII as optimal handoff candidates whereas the prior art would merely deem the mobile 12 to be located in cell I and include III and IV in the neighbor list along with cells II, V, VI, and VII. However, based on the location of the mobile 12, cells III and IV are less than optimal choices as handoff candidates and should not be included in the neighbor list. Therefore, a neighbor list is optimized for grid element 17 to include only neighbors VI and VII rather than being tied to serving cell I. This neighbor list is then provided to the mobile 12 when the GPS assisted location approach locates mobile 12 as being within grid element 17.

The neighbor list for each grid element 16–20 is determined by the mobile 12 based on pilot measurements that exceed an add-threshold level. This allows the neighbor list to be learned and enhanced as the system matures. Since the optimal neighbor list assignments will be small, there is more time available for pilot scanning. The add-threshold level may be for example, a T_ADD threshold. The T_ADD threshold is a handoff threshold measurement used in CDMA, as is well known in the art, though other add-threshold measurements may also be used. The pilot measurement is also used in CDMA and is well known by those skilled in the art.

Figure 3:
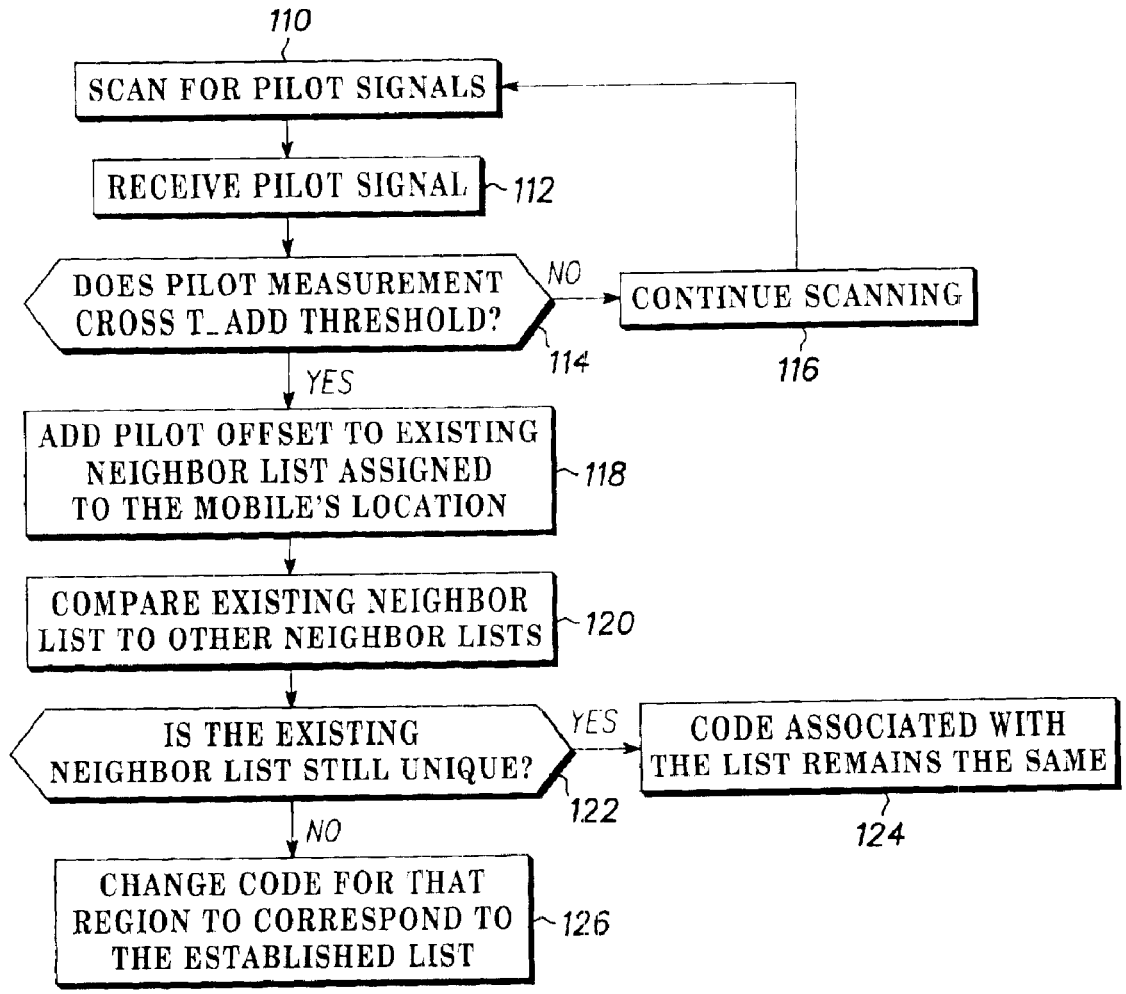
FIG. 3 is a flow chart depicting the steps performed by a mobile station in updating a neighbor list and corresponding code when the code was initially unique.

When the pilot measurement of a neighboring cell crosses the T_ADD threshold, a logical identifier representing that cell is added to the existing neighbor list currently assigned to that grid element. The logical identifier may be, for example, a pilot offset as is used in CDMA. FIG. 3 depicts the process of adding and updating the neighbor list for a grid element when the neighbor list is initially considered unique. The mobile 12 scans for pilots at block 110. A pilot signal is transmitted by a base station and received by the mobile 12 at step 112, and if the pilot measurement crosses the T_ADD threshold, the pilot offset representing the cell corresponding to the pilot measurement is added to the existing neighbor list currently assigned to that grid element at steps 114 and 118. Otherwise the mobile continues scanning as shown by block 116.

If the addition of the pilot offset allows the neighbor list to remain unique as compared to the neighbor lists of other grid elements 122, then the code associated with that location (or grid element) does not change as shown at step 124. However, if the neighbor list is now identical to another existing neighbor list, then the grid element code will change to correspond to the established neighbor list at step 126.

Figure 4:
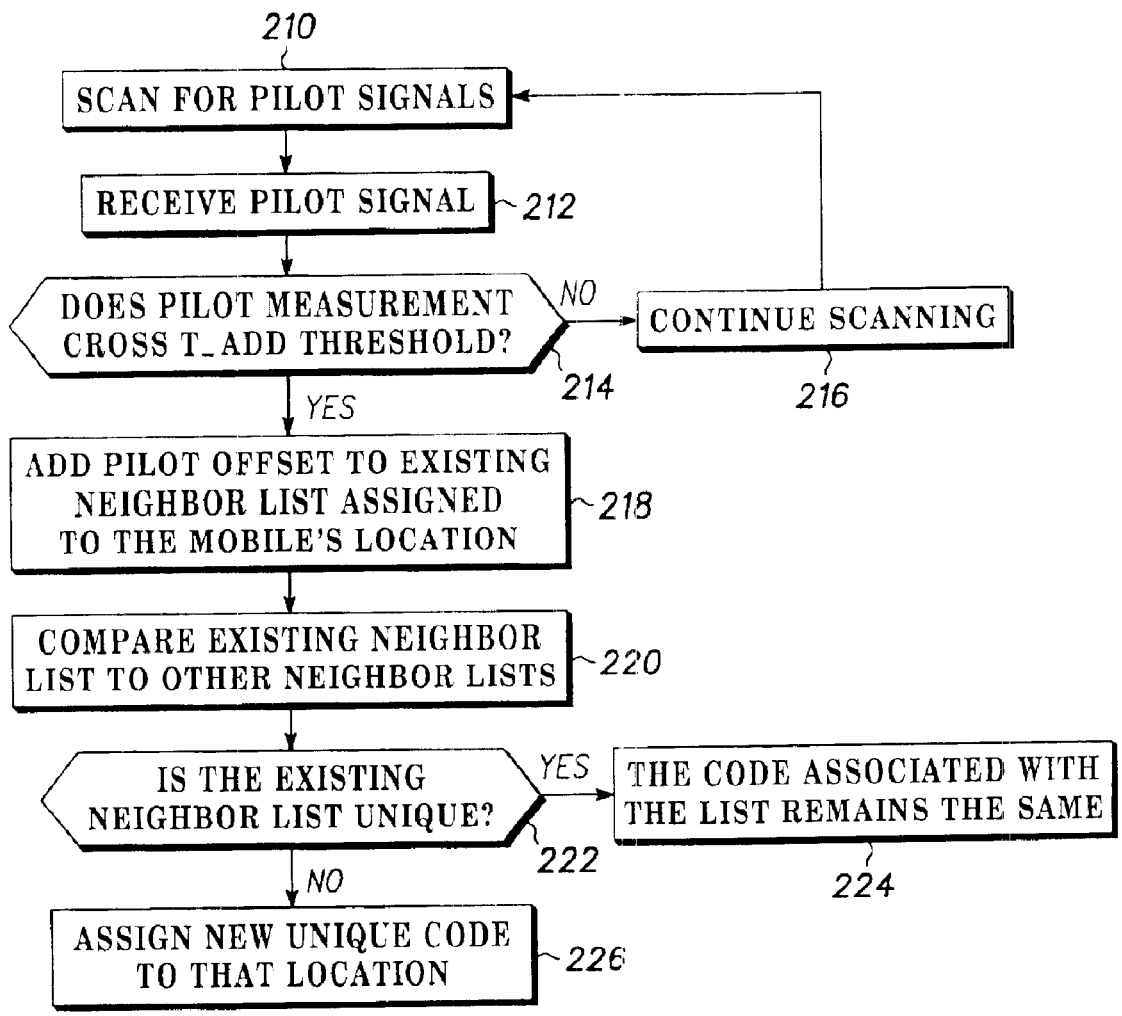
FIG. 4 is a flow chart depicting the steps performed by a mobile station in updating a neighbor list and corresponding code when the code was initially not unique.

FIG. 4 is a flow chart depicting the above scenario when a neighbor list was initially not unique (i.e. there was another grid element that had an identical neighbor list). Steps 210–220 are essentially the same as steps 110–120. If at step 222 it is determined that the newly added pilot offset caused the existing neighbor list assignment to become unique, then a new unique code is associated with that grid element at step 226. Otherwise the code associated with the list remains the same 224.

As mentioned above, it is possible that there are two or more grid elements with identical neighbor lists. There is a high probability that adjacent grid elements, such as grid elements 18 and 19, will share the same code because the geographic region requires the same optimal neighbor list assignment. For example, referring again to FIG. 2, grid elements 18 and 19 could each have a neighbor list consisting of cells I, II and VII. Therefore, when a new grid element is entered, the new neighbor list code will be compared with the current neighbor list code assigned to the mobile. If the code is different, then the mobile station 10 is sent a new neighbor list corresponding to its new location. Otherwise, the mobile station 12 retains its current neighbor list, such as when the mobile moves from grid element 18 to grid element 19.

For example, if the mobile station 10 were to move from grid element 19 to grid element 18, the lists for both grid elements would be compared and found to be the same. Thus, mobile station 10 retains the neighbor list associated with grid element 19. If, however, the mobile station 10 moves from grid element 17 to grid element 19, the current neighbor list (i.e. the list of grid element 17 consisting of cells I, VI and VII) is compared to the neighbor list of grid element 19 (i.e. I, II and VII). Since the lists are different, the mobile station 10 is sent the neighbor list for grid element 19.

When the mobile 12 approaches or crosses a grid element boundary, thrashing can occur between two different neighbor lists at the boundary. This can also be due to location estimate inaccuracies. To further insure that the mobile 12 is handed off to the most optimal cell, it needs to be made sure that the desired pilot offsets for the new location are in the neighbor list assignment. Therefore, to alleviate the above problems and ensure a smooth transition between grid elements and the assigned neighbor lists, a merge of neighbor lists between the current grid element and adjacent grid elements is performed.

If the current grid element has an adjacent grid element(s) with a different neighbor list code(s), then the neighbor list assignment sent to the mobile will contain a merge of the current and adjacent neighbor lists. For example, if the mobile 12 is in grid element 17 the neighbor list assignment sent to the mobile 12 consists of the optimal neighbor lists of grid elements 17 and 19. Thus, the merged neighbor list will include cells I, II, VI and VII (I, VI and VII from grid element 17 and I, II and VII from grid element 19). Finally, if a call ever fails because a logical identifier was not in the neighbor list for a given grid element, then the neighbor list will be updated to include this for future mobiles that traverse this grid element.

The above embodiment has made reference to the assignment of neighbor lists to the mobile 12. However, as it would be clear to those skilled in the art, the above described system and method is applicable to other system control parameters as well. Such system control parameters include, but are not limited to, power control, handover thresholds and handover timers. The merging of any of these system control parameters can be achieved by averaging, taking a weighted average, taking the average of multiple grid elements, or utilizing minimum and maximum values. Furthermore, the operator may decide between any of the above methods of merging as are appropriate for the circumstances. While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A method of assigning an optimum system control parameter to a mobile station in a wireless communications system having one or more transceivers, comprising the steps of:

dividing the coverage area of the communications system into a plurality of defined geographic regions irrespective of the locations of the one or more transceivers;

assigning a code to each of the geographic regions irrespective of the locations of the one or more transceivers, wherein the code corresponds to a system control parameter optimized for that geographic region;

locating a mobile station as being within a first geographic region of the plurality of defined geographic regions;

providing the mobile station with the code for the first geographic region and the corresponding system control parameter optimized for the first geographic region;

locating the mobile station as being within a second geographic region of the plurality of defined geographic regions;

comparing the code assigned to the second geographic region with the code assigned to the first geographic region; and providing the mobile station with the code for the second geographic region and the corresponding system control parameter optimized for the second geographic region if, during the step of comparing, the code assigned to the first geographic region is different from the code assigned to the second geographic region.

2. The method of claim 1, wherein the plurality of defined geographic regions are defined by one of location estimates and grid elements.

3. The method of claim 1, wherein the system control parameter is one of a neighbor list of optimum hand-off candidates, a power control threshold, a handover threshold and a handover timer.

4. A mobile station capable of communicating with one or more base stations within a communication system providing wireless communication in a coverage area, the mobile station comprising:

means for being located within one of a plurality of regions each corresponding to location estimates independent of the one or more base stations, wherein the plurality of regions together comprise a reference frame applied to the coverage area;

means for receiving a code corresponding to a system control parameter optimized for the region the mobile station is currently located; and means for updating the system control parameter, wherein the means for updating the system control parameter comprises:

means for comparing a first code assigned to a first region of the plurality of regions with a second code assigned to a second region of the plurality of regions; and means for determining if the first code is equivalent to the second code, wherein the means for receiving a code includes means for receiving a second system control parameter in response to the means for determining if the first code is eguivalent to the second code.

5. The mobile station of claim 4, further comprising means for retaining the system control parameter, wherein the means for retaining the system control parameter comprises a flash memory module.

6. The mobile station of claim 4, wherein the first region is a region of the plurality of regions in which the mobile station is currently located and the second region is a region of the plurality of regions in which the mobile station was previously located.

7. The mobile station of claim 6, wherein the second code is the code currently assigned to the mobile station.

8. The mobile station of claim 4, further comprising means for performing pilot scanning.

9. The mobile station of claim 4, further comprising means for merging two or more system control parameters.

10. The method of claim 4, wherein the reference frame is one of a set of geographic coordinates and a grid, wherein the plurality of regions are grid elements.

11. The method of claim 4, wherein each of the plurality of regions accounts for a variance in the location estimate.

12. The method of claim 4, wherein the system control parameter is one of a neighbor list of hand-off candidate calls, a handover timer, a handover threshold and a power control threshold.

13. In a communication system providing wireless communication in a coverage area, a method of providing neighbor lists to a mobile station optimized for the mobile station's location in order to aid in hand-offs between a plurality of transceivers, the method comprising:

assigning a first code to a first region, the first region being defined irrespective of the plurality transceivers' locations, wherein the first code corresponds to a neighbor list optimized for the first region;

assigning a second code to a second region, the second region being defined irrespective of the plurality of transceivers' locations, wherein the second code corresponds to a neighbor list optimized for the second region;

comparing the first code assigned to the first region, with the second code assigned to the second region;

merging the neighbor lists corresponding to the first and second regions if the first code assigned to the first region is different from the second code assigned to the second region, resulting in a merged list; and providing the merged list to a mobile station located in the first region.

14. The method of claim 13, wherein the second region is adjacent to the first region.

15. The method of claim 13, wherein the first and second regions are grid elements.

16. The method of claim 13, wherein the wireless communication system is code division multiple access (CDMA) cellular system.

17. The method of claim 13, wherein the first and second regions correspond to location estimates.

18. The method of claim 17, wherein the first and second regions account for a variance in the location estimate.

19. A method of building and optimizing system control parameters for a cellular communications system having a plurality of base stations and a plurality of receiving locations irrespective of the locations of the plurality of base stations wherein each of the plurality of receiving locations is assigned a code corresponding to a unique set of system control parameters, the method comprising:

identifying a first set assigned to a first receiving location of the plurality of receiving locations as being unique or equivalent as compared to a second set assigned to a second receiving location of the plurality of receiving locations;

receiving at the first receiving location a signal within an acid-threshold level from a base station;

adding the signal to the first set creating an updated set;

comparing the updated set to the second set; and determining a code to be associated with the first receiving location after the step of comparing.

20. The method of claim 19, wherein the step of determining a code to be associated with the first receiving location comprises:

modifying the first code associated with the first receiving location, comprising the steps of:

changing the first code to correspond to the code of the second receiving location if, during the step of identifying, the first set was identified as being unique, and if, during the step of comparing, the updated list is equivalent to the second set; and associating a new unique code with the first receiving location if, during the step of identifying, the first set was identified as being equivalent, and if, during the step of comparing, the updated set was unique as compared to the second set.

21. The method of claim 19, wherein the threshold signal is one of an add-threshold signal and a pilot measurement that exceeds a threshold.

22. The method of claim 19, wherein the plurality of receiving locations are one of grid elements and location estimates.

23. The method of claim 19, wherein the system control parameter is one of a neighbor list of hand-off candidate cells, a handover timer, a handover threshold and a power control threshold.

* * * * *